(12) United States Patent
Huang et al.

(10) Patent No.: US 7,577,780 B2
(45) Date of Patent: Aug. 18, 2009

(54) FINE-GRAINED BANDWIDTH CONTROL ARBITER AND THE METHOD THEREOF

(75) Inventors: Juinn-Dar Huang, Jhu-Bei (TW);
Bu-Ching Lin, Wur-Rih Township, Taichung County (TW); Geeng-Wei Lee, Taipei (TW); Jing-Yang Jou, Hsin-Chu (TW)

(73) Assignee: National Chiao Tung University, Hsin-Chu (TW)

( * ) Notice: Subject to any disclaimer, the term of this patent is extended or adjusted under 35 U.S.C. 154(b) by 184 days.

(21) Appl. No.: 11/711,663

(22) Filed: Feb. 28, 2007

(65) Prior Publication Data
US 2008/0209093 A1    Aug. 28, 2008

(51) Int. Cl.
*G06F 13/36* (2006.01)

(52) U.S. Cl. .................. 710/116; 710/117; 710/243

(58) Field of Classification Search .......... 710/117, 710/120, 123, 124, 240, 243, 244
See application file for complete search history.

(56) References Cited

U.S. PATENT DOCUMENTS

| | | | |
|---|---|---|---|
| 5,784,569 A * | 7/1998 | Miller et al. | 709/235 |
| 5,956,493 A * | 9/1999 | Hewitt et al. | 710/113 |
| 6,058,450 A * | 5/2000 | LaBerge | 710/107 |
| 6,138,200 A * | 10/2000 | Ogilvie | 710/244 |
| 6,826,640 B1 * | 11/2004 | Chang | 710/107 |
| 6,877,053 B2 * | 4/2005 | Lahiri et al. | 710/113 |
| 7,231,477 B2 * | 6/2007 | Toyokura | 710/241 |

OTHER PUBLICATIONS

A Real Time and Bandwidth Guaranteed Arbitration Algorithm for SoC Communication, Chen et al., Jan. 26, 2006.*
Design and Implementation of a Lottery-Based Bandwidth Guaranteed and Low Latency Arbiter for On-Chip Bus, Yao et al., Jul. 2006 (publication date indicated in Bandwidth Issues White Papers at silicon.com).*
Bandwidth Issues White Papers, <http://whitepapers.silicon.com/0,39024759,60402988p,00.htm>, accessed on Oct. 23, 2008.*

* cited by examiner

*Primary Examiner*—Khanh Dang
(74) *Attorney, Agent, or Firm*—Birch, Stewart, Kolasch & Birch, LLP

(57) ABSTRACT

A fine-grained bandwidth control arbiter manages the shared bus usage of the requests of the masters which have real-time and/or bandwidth requirements, moreover, the masters are preset a ticket respectively. The arbiter consists of three components, a real-time handler, a bandwidth regulator, and a lottery manager with tuned weight. The real-time handler grants the most urgent request. The bandwidth regulator handles the bandwidth allocation and blocks the requests of masters that have met the bandwidth requirement. The lottery manager with tuned weight stochastically grants one of the contending masters according to the ticket assignment.

18 Claims, 3 Drawing Sheets

FINE-GRAINED BANDWIDTH CONTROL ARBITER AND THE METHOD THEREOF

FIELD OF THE INVENTION

The present invention relates to an arbiter, it specifically relates to a fine-grained bandwidth control arbiter and its arbitration method.

BACKGROUND OF THE INVENTION

In a shared bus system which consists of multiple masters and slaves, the data transmissions among these masters and slaves, for example, the transmissions of control signals and data, etc. are all through a shared bus. When multiple masters in the system sending out bus usage requests and compete for the priority of usage of the shared bus, bus contention thus occurs; therefore, an arbiter is needed which should make appropriate arbitration on the priority of usage of the shared bus based on the real-time requirements or bandwidth requirements of the master. The real-time requirement of the master means the requirement proposed should be completed within a limited time and the bandwidth requirement means certain amount of data transmission is needed; therefore, if the real-time or bandwidth requirement of any master is violated, this system will be unable to work properly.

In a shared bus system, conventional arbitration method consists of:

1. First-Come-First-Served

The data first come will be the first served. Since the bandwidth requirement of each master is not considered, uneven system bandwidth distribution could easily be the result.

2. Fixed Priority

When bus contention occurs, the master having higher priority will be the first served, which might lead to the starvation of the master having lower priority; therefore, uneven system bandwidth distribution still occurs.

3. Dynamic Priority

This is a method that changes dynamically the priority of each master to improve the usage effectiveness of shared resource. There are many ways to change the priority of the master; however, it is still difficult to avoid the starvation of master having lower priority.

4. Earliest Deadline First

This is a method to complete in the first priority the data transmission requirement which is closest to the deadline, although it can satisfy the real-time requirement of each data transmission, uneven system resource distribution could easily be the result.

5. Round-Robin

This is a method that distributes system bandwidth evenly to each master and limits that each master sharing the resource can only use the same amount of bandwidth; therefore, it could easily lead to the delay of real-time data transmission requirement.

6. Time-division Multiplexing

The priority of usage of shared bus is determined by the time slots assigned in advance, although this method can distribute evenly system bandwidth based on the requirement of master, yet when the system is too complicated, the design of time slot is difficult to satisfy simultaneously the real-time and bandwidth requirement of each master.

7. Random

This is a method that determines randomly and dynamically the priority of usage of shared bus according to the ticket distribution preset in the system and the shared bus usage situation proposed by master; although it can evenly distribute the priority of bandwidth usage of each master, yet it can not handle real-time data transmission.

In a patent with patent number 93136895 applied in Taiwan, Republic of China, named "A bus arbiter, bus device and bus arbitration method", a bus system is disclosed, which consists of multiple counters and a control circuit; the counter means the amount of usage of bandwidth of each master, which is used to record the frequency of usage of bus by each master; the control circuit then changes the priority of the master according to the counted value on the counter and the priority of usage of shared bus is determined through the amount of bandwidth usage that is preset in advance. Although this kind of arbitration method can satisfy the bandwidth requirement of each master, yet the real-time requirement of the master is not considered. In a patent with patent number I257551, named, "Bus arbitration system and method", an arbitration system comprising of a priority order distribution device and a arbiter circuit is disclosed, which can effectively reduce the access time of the master having higher priority and change dynamically the priority of master; therefore, the starvation of master faced in the arbitration method having fixed priority can thus be avoided. However, such method can not cope effectively with the real-time requirement of master. Furthermore, a patent applied in Taiwan, Republic of China with patent number I258081, named "A bus control priority arbitration method and arbiter", an arbitration system consists of multiple time accumulator is disclosed; therefore, when any master in the system proposes bus usage request, its corresponding time accumulator will then start to accumulate; when the value in the time accumulator is larger than the preset threshold value, the master will then obtain the highest priority of usage of the bus; although this kind of arbitration method can satisfy the real-time requirement of each master, yet the bandwidth requirement is not considered and system bandwidth is thus difficult to be distributed evenly. In a patent applied in Taiwan, Republic of China with patent number I220500, a system consists of equipment Round-Robin order table, transmission requirement table and equipment usage record table is proposed; in the system, equipment Round-Robin order table and transmission requirement table are dynamically checked in order to decide the bus usage order of each master; in the mean time, the usage situation is recorded in the equipment usage record table. The bus usage situation by the master is recorded through massive amount of memory devices in order to adjust dynamically the arbitration method and satisfy the real-time and bandwidth requirement of each master. However, the very important equipment Round-Robin table in the present invention is still difficult to be designed in the present complicated system. In addition, in an U.S. patent with U.S. Pat. No. 6,633,939, an arbitration method with dynamic priority is disclosed which, based on the behavior of the master, changes the master's corresponding priority dynamically. Since usually the master having higher priority obtains the priority of usage of the bus, the starvation of master having lower priority is still difficult to be avoided. In an U.S. patent with U.S. Pat. No. 6,694,488, which is also an arbitration method of dynamic priority; in the system, each master consists of a communication architecture tuner (CAT) circuit which is used to decide appropriately the priority of usage of bus for each master when bus contention occurs. Although the CAT circuit can help arbiter to satisfy the real-time requirement of master, yet the bandwidth requirement can not be satisfied in the same time. In an U.S. patent with U.S. Pat. No. 6,877,053, an arbitration method based on random number is proposed; in the system, each master has a preset ticket, therefore, when bus contention occurs, arbiter will grant arbitrarily the priority of usage of the bus according to weighted average way and according to the tickets of each master; although such method can fairly distribute bandwidth, the real-time requirement of each master is not taken into account.

Therefore, an arbiter and arbitration method that can satisfy the simultaneous real-time and bandwidth requirements of the master in a system is thus hoped.

SUMMARY OF THE INVENTION

One purpose of the present invention is to provide a three levels arbiter.

Another purpose of the present invention is to provide a three-level shared bus control arbitration method.

According to the present invention, an arbiter consists of a real-time handler, a bandwidth regulator and a lottery manager with tuned weight; therefore, when multiple masters propose bus usage requests, the arbiter will decide the priority of usage of a shared bus. Those masters have real-time and/or bandwidth requirements and tickets are preset respectively; the real-time handler will check whether the bus usage requests as sent out by those masters include real-time requests and judge if those bus usage requests are urgent and finally agree the most urgent bus usage request; if there are no urgent bus usage requests in the system, the real-time handler will not be in action and the bandwidth regulator will detect if those bandwidth requirements from those masters are satisfied and limit those masters that have bandwidth requirements satisfied to send out bus usage requests; the lottery manager with tuned weight will grant the usage request of any bus in weighted average way and in random way based on the tickets of those masters and the proposed bus usage requests.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
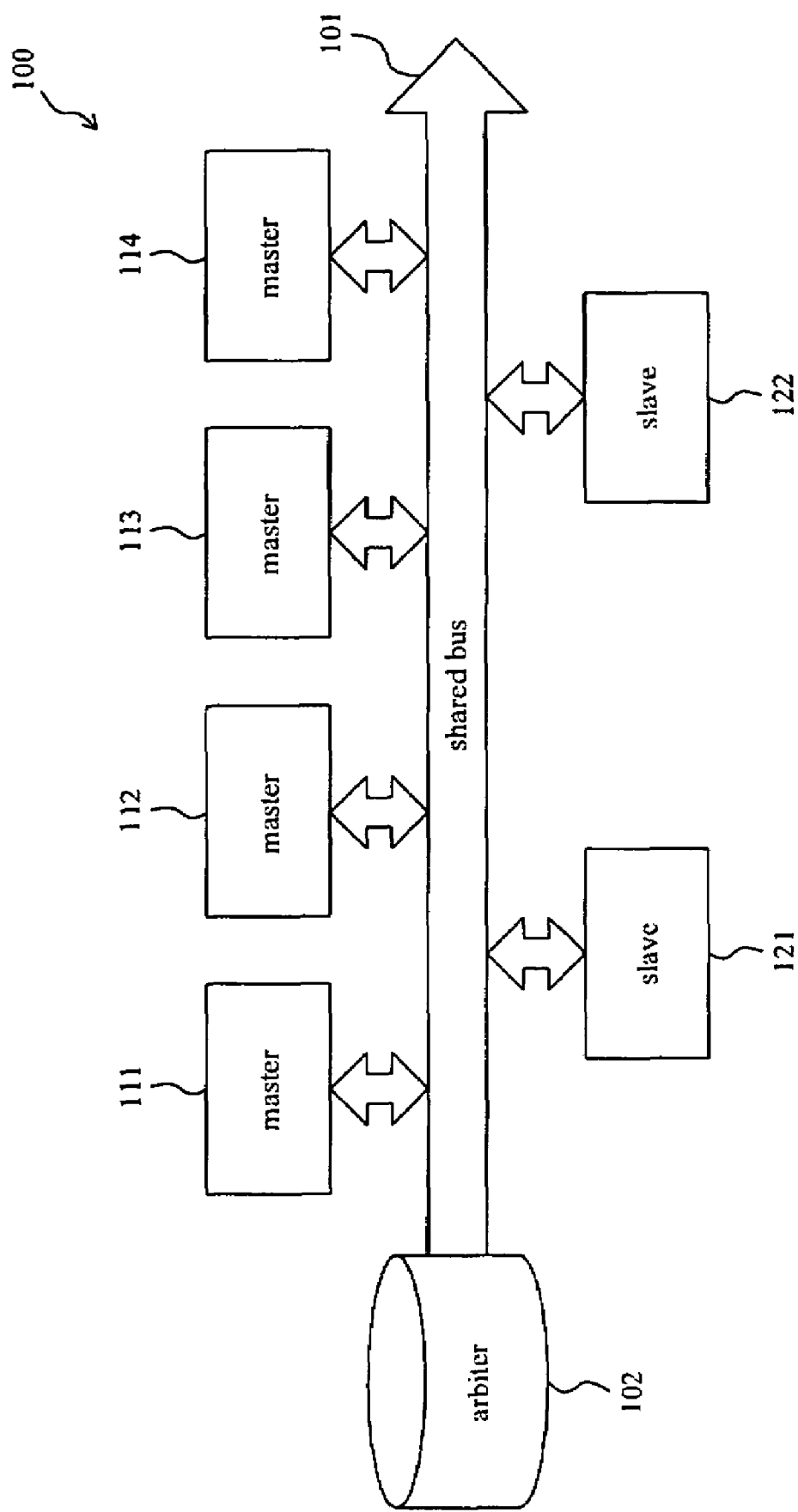
FIG. 1 is an illustration of shared bus system.

FIG. 1 is an illustration of the shared bus system 10 based on the present invention, the master 111, 112, 113, 114 and the slave 121, 122 will perform data transmissions through the shared bus 101; the arbiter 102 is connected to each master and can perform appropriate arbitration on real-time and/or bandwidth request according to the tickets of the master when the bus contention occurs.

Figure 2:
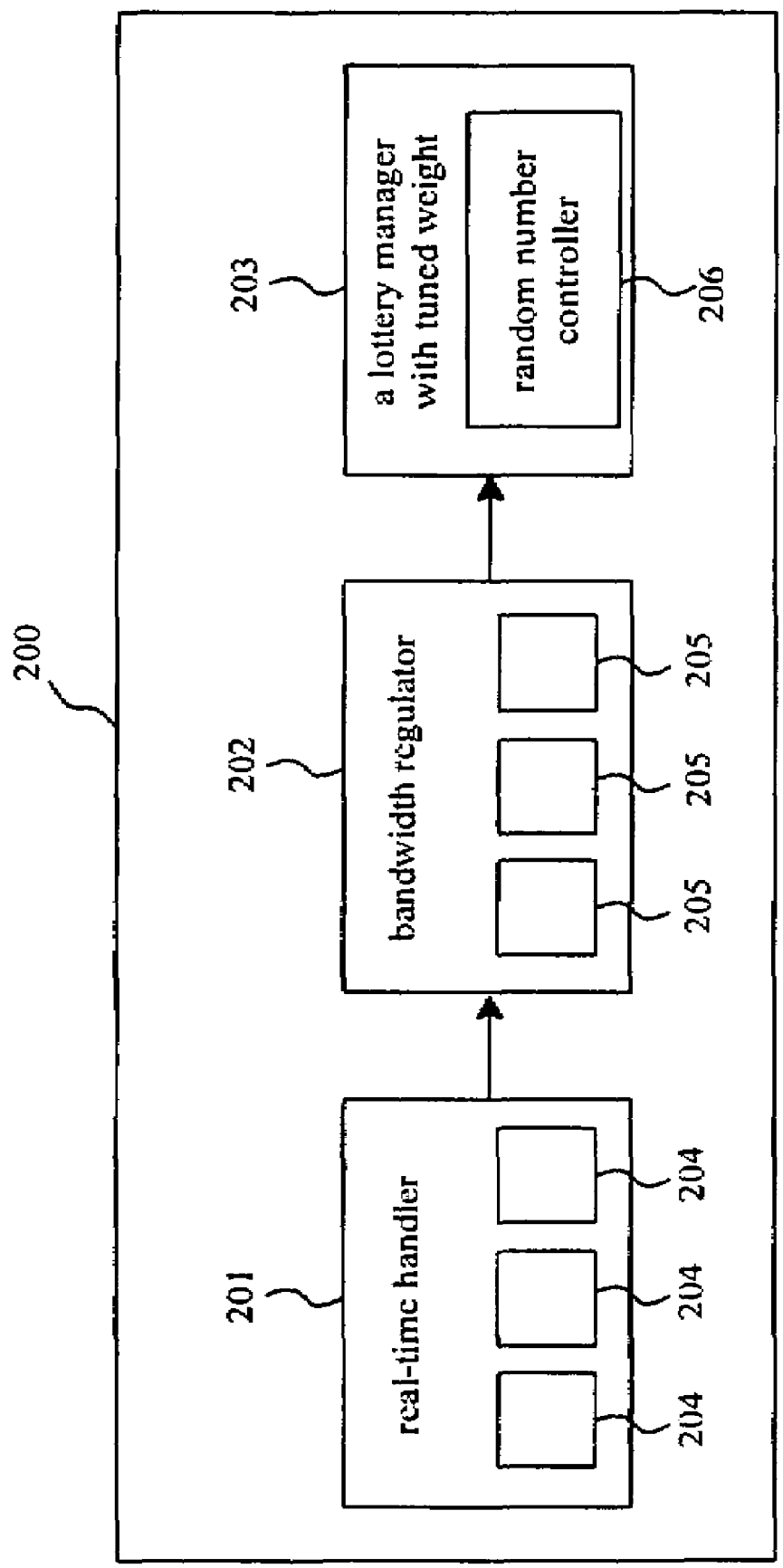
FIG. 2 is a block diagram according to one embodiment of the present invention.

FIG. 2 is a block diagram of the arbiter based on the present invention. Arbiter 200 consists of a real-time handler 201, a bandwidth regulator 202 and a lottery manager with tuned weight 203 so as to provide a three-level bus control arbitration method.

Real-time handler 201 consists of multiple real-time counters 204 and a warning line, each real-time counter is corresponded to a master respectively and the counter is used to record the difference between the bus usage request time proposed by the master and the current time, that is, the waiting time of the master; the warning line is preset by the users in advance and it means the shortest time to solve the bus contention in the system. When the master sends out bus usage request, the real-time handler 201 will check if the bus usage request includes real-time requirement, then the real-time counter 204 corresponded to the master which sends out bus usage request, which includes real-time requirement, will start to count and stop until the right of usage of bus is obtained by the master. If the real-time counter 204 reaches the warning line, it means the bus usage request sent out by the master is urgent and the real-time handler 201 will grant in the first priority the bus usage request and give the bus usage priority to the master. If there is no urgent bus usage request, the real-time handler 201 will not be in action. In the present embodiment, the real-time counter 204 is a down-counting counter, therefore, when there is real-time bus usage request propose by the master, the real-time counter 204 corresponded to the master will then start the down-counting from a preset value; when the real-time counter 204 down-counts to a counted value smaller than the warning line, the real-time handler 201 will then treat the usage request of the bus as urgent and grant in the first priority the usage request of the bus. If the multiple urgent masters exist in the system, the real-time handler 201 will treat the bus usage request corresponding to the real-time counter 204 having smallest counted value as the most urgent and grant the most urgent bus usage request. If all the counted values of real-time counter 204 are all larger than the warning line, it means there are no urgent bus usage requests and the real-time handler 201 will thus not be in action.

The bandwidth regulator 202 will check the bus bandwidth of each master and the bandwidth regulator 202 consists of multiple bandwidth registers 205 to record respectively the bus usage of each master transmission. Each bandwidth register 205 will start the counting when the corresponding master acquires bus usage priority until the bus usage priority is released by the master; the bandwidth regulator 202 will check the bus usage proportion by each master and when in a certain period of time, if the bandwidth usage proportion of the master exceeds the bandwidth requirement of the master, that is, the bandwidth requirement of the master is satisfied, the bandwidth regulator 202 will temporarily limit bus usage request sent out by the master and yield the bus usage priority to the other master which has bandwidth not satisfied in the system.

A lottery manager with tuned weight 203 consists of random number controller 206 and the random number controller 206 is stored with tickets of each master; the ticket assignment can be simulated by software or can be decided by the experiences of the designer, therefore, when the bus contention occurs and when the real-time handler 201 is not in action, the random number controller 206 will then grant the bus usage priority of any master in weighted random way according to tickets of each master and the bus usage request proposed by each master.

In order to provide the above-mentioned message to the real-time handler 201, to bandwidth regulator 202 and to a lottery manager with tuned weight 203, each master in shared bus system also consists of a real-time counter, which is used to reflect the urgency of the real-time requirement of the master, for example, a down-counting counter. Each master further consists of a bandwidth register to record respectively the bus usage proportion to be provided to the bandwidth regulator 202; moreover, the arbiter 200 will grant at most one usage request from one bus in the same time point, that is, only one master can acquire the bus usage priority in one time.

Figure 3:
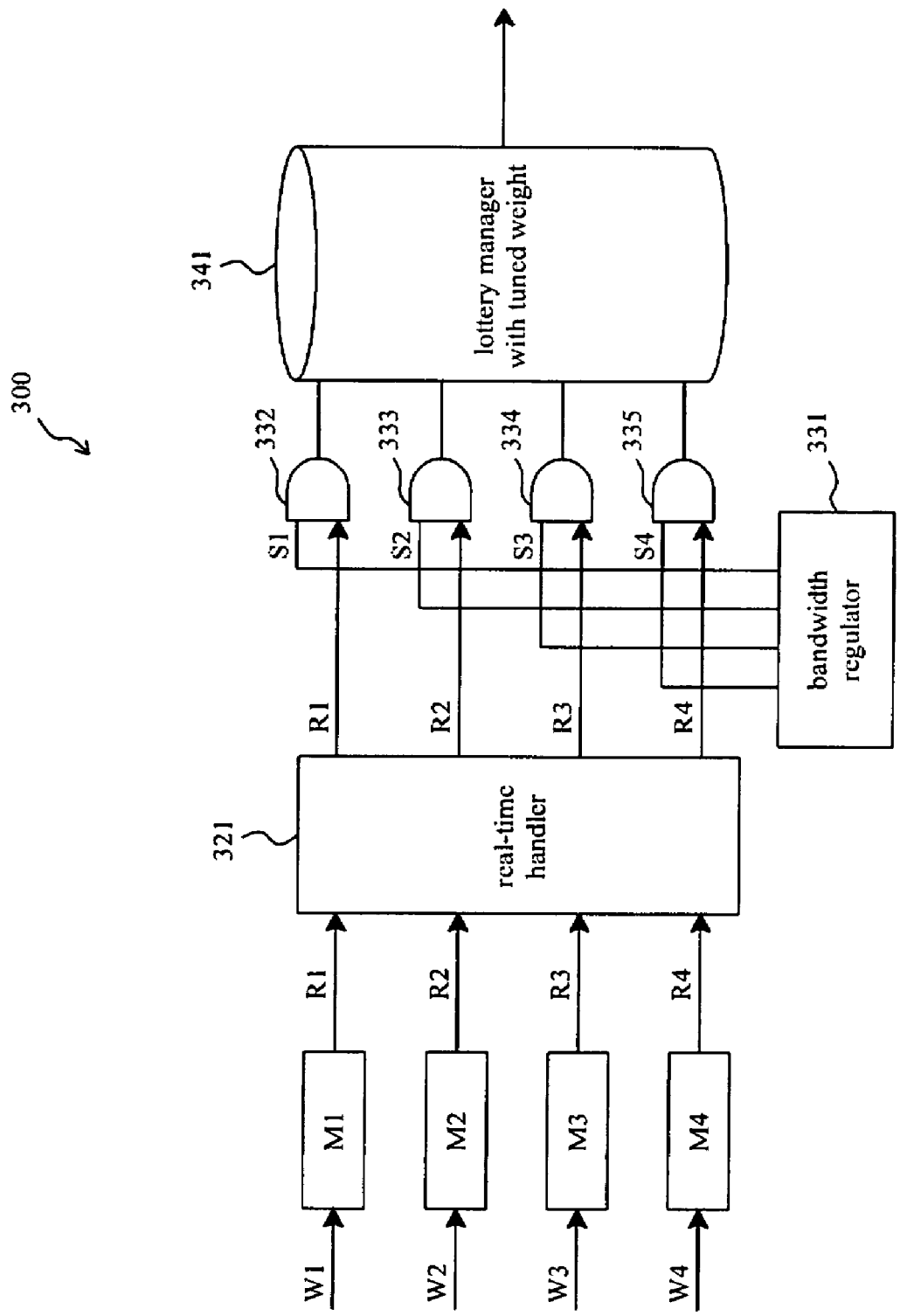
FIG. 3 is an illustration according to one embodiment of the present invention.

FIG. 3 is an embodiment of arbiter according to the present invention, the bus arbitration system 300 consists of the master M1, M2, M3 and M4, to propose respectively bus usage requests, which include real-time and bandwidth requirements, R1, R2, R3 and R4; the real-time handler 321 will check if bus usage requests R1~R4 include real-time requirements and judge their urgency so as to assign the shared bus usage priority to the master that has urgent and real-time requirement. The bandwidth regulator 331 will record the bandwidth usage proportion of each master and generate limiting signals S1~S4 according to the satisfaction situation of the bandwidth requirements of these masters. If there is no urgent master in the system, the real-time handler 321 will not be in action and the bus usage priority will be decided by the lottery manager with tuned weight 341; limiting signals S1~S4 will then limit bus usage requests R1~R4, through AND GATE 332~335, from entering a lottery manager with tuned weight 341 to limit the bus usage request of a master that has bandwidth requirement satisfied; a lottery manager with tuned weight 341 will then grant in weighted random way the bus usage request from any master according to tickets W1~W4 of master M1~M4 and the bus usage requests limited by the limiting signals S1~S4.

What is claimed is:

1. A fine-grained bandwidth control arbiter is used to decide the usage priority of a shared bus when multiple masters propose bus usage requests on a shared bus, the masters possess respectively real-time requirement and bandwidth requirement and are preset with tickets respectively, the arbiter comprising:
   a real-time handler configured to judge if the bus usage requests are urgent when the bus usage requests include real-time requirements and to grant the most urgent bus usage request;
   a bandwidth regulator connected to the real-time handler and configured to detect satisfaction of the bandwidth requirements of the masters, and within a certain period of time, to limit the bus usage requests of the masters with the bandwidth requirements satisfied, wherein when the bandwidth requirements of one or more of the masters are satisfied in a certain period of time, the bandwidth regulator temporarily limits the bus usage request sent out by the one or more of the masters and yields the bus usage priority to the other one or more masters of which the bandwidth requirements are not satisfied;
   a lottery manager with tuned weight connected to the bandwidth regulator and configured to grant the usage request of one of the masters in a weighted random way based on the tickets and determination of the satisfaction of the bandwidth requirements of the masters determined by the bandwidth regulator; and
   a plurality of AND gates respectively corresponding to the maters, wherein each of the AND gate receives a corresponding one of the bus usage requests and a corresponding one of limiting signals from the bandwidth regulator and outputs a resulting signal to the lottery manager with tuned weight to determine whether to limit the bus usage request of the corresponding one of the masters,
   wherein when there is no urgent bus usage request, the real-time handler is not in action.

2. The fine-grained bandwidth control arbiter of claim 1, wherein the real-time handler includes multiple counters corresponding to the masters and the real-time handler is used to record the waiting time of the usage request of each bus.

3. The fine-grained bandwidth control arbiter of claim 2, wherein the real-time handler treats the bus usage request as urgent when the waiting time of any bus usage request reaches the warning line.

4. The fine-grained bandwidth control arbiter of claim 2, wherein the counters are down-counters which down-count from a preset value to generate multiple counted values so as to record the waiting time of the bus usage requests when corresponding masters send out bus usage request which includes real-time requirement.

5. The fine-grained bandwidth control arbiter of claim 4, wherein the real-time handler treats the bus usage request corresponding to the counted value as urgent when any counted value is smaller than the warning line.

6. The fine-grained bandwidth control arbiter of claim 5, wherein when there are several urgent bus usage requests, the real-time handler treats bus usage request of smallest counted value as the most urgent and grant the most urgent bus usage request.

7. The fine-grained bandwidth control arbiter of claim 1, wherein the bandwidth regulator consists of multiple bandwidth registers to correspond respectively the masters so as to record the bandwidth usage proportion of each master.

8. The fine-grained bandwidth control arbiter of claim 1, wherein the lottery manager with tuned weight includes a random number controller.

9. The fine-grained bandwidth control arbiter of claim 1, wherein at the same point of time, the arbiter only grants one bus usage request.

10. A fine-grained bandwidth control arbitration method for determining a usage priority of the shared bus when multiple masters propose usage requests on a shared bus, the masters possessing real-time requirements and bandwidth requirements and being respectively preset with tickets;, the method comprising:
    checking if the bus usage requests include real-time requirements;
    judging if the bus usage requests, which include real-time requirements, are urgent;
    granting the most urgent bus usage request;
    detecting if the bandwidth requirements of the masters are satisfied;
    limiting the bus usage requirements of the masters with the bandwidth requirements satisfied, wherein when the bandwidth requirements of one or more of the masters are satisfied in a certain period of time, temporarily limiting the bus usage request sent out by the one or more of the masters and yielding the bus usage priority to the other one or more masters of which the bandwidth requirements are not satisfied; and
    granting in a weighted random way any of the bus usage requests according to the tickets and a result of the step of detecting if the bandwidth requirements of the masters are satisfied,
    wherein the step of limiting the bus usage requirements of the masters includes performing an AND operation of each one of the bus usage requests corresponding to one of the masters and one of limiting signals corresponding to the one of the masters to determine whether to limit the bus usage request of the corresponding one of the masters.

11. The fine-grained bandwidth control arbitration method of claim 10, wherein the step of judging if the bus usage requirements, which include real-time requirements, are urgent includes recording the waiting time of the usage request of each bus.

12. The fine-grained bandwidth control arbitration method of claim 11, wherein when any waiting time reaches the warning line, the bus usage request corresponding to the waiting time is treated as urgent.

13. The fine-grained bandwidth control arbitration method of claim 11, wherein the step of recording the waiting time of the usage request of each bus includes generating a counted value by counting down from a preset value.

14. The fine-grained bandwidth control arbitration method of claim 13, wherein when a counted value is smaller than the warning line, the bus usage request corresponding to the counted value is seen as urgent.

15. The fine-grained bandwidth control arbitration method of claim 14, wherein when multiple urgent bus usage requests exist, the bus usage request with smallest counted value is granted.

16. The fine-grained bandwidth control arbitration method of claim 10, wherein the method further the step of recording a bandwidth usage proportion of each master.

17. The fine-grained bandwidth control arbitration method of claim 16, wherein the step of recording the bandwidth usage proportion of each master includes starting counting when the corresponding master acquires bus usage priority until the bus usage priority is released by the master.

18. The fine-grained bandwidth control arbitration method of claim 10, wherein the arbitration method grants only one bus usage request at each time.

* * * * *